(12) United States Patent
Li et al.

(10) Patent No.: US 7,629,074 B2
(45) Date of Patent: Dec. 8, 2009

(54) BATTERY COVER LATCHING ASSEMBLY FOR PORTABLE ELECTRONIC DEVICE

(75) Inventors: Shao-Long Li, Shenzhen (CN); Shui-Yuan Qin, Shenzhen (CN); Chia-Hua Chen, Tucheng (TW); Hsiao-Hua Tu, Tucheng (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 570 days.

(21) Appl. No.: 11/307,745

(22) Filed: Feb. 20, 2006

(65) Prior Publication Data

US 2006/0205269 A1    Sep. 14, 2006

(51) Int. Cl.
    H01M 2/10    (2006.01)
    H01M 2/00    (2006.01)
    H02B 5/00    (2006.01)

(52) U.S. Cl. .......................... 429/97; 429/96; 429/163; 361/615

(58) Field of Classification Search .................. None
    See application file for complete search history.

(56) References Cited

U.S. PATENT DOCUMENTS

2005/0225933 A1* 10/2005 Kang et al. ................. 361/679

FOREIGN PATENT DOCUMENTS

CN            1520128 A      8/2004

* cited by examiner

Primary Examiner—Dah-Wei D Yuan
Assistant Examiner—Steven Scully
(74) Attorney, Agent, or Firm—Steven M. Reiss

(57) ABSTRACT

A battery cover latching assembly (30) is used in a portable electronic device (9). The portable electronic device has a housing (10) and a battery cover (20). The battery cover has a flange (242) extending from one end portion thereof. The housing defines a receiving cavity (18) in one end portion thereof. The battery cover latching assembly includes a button (40) and a wedging block (52). The button has a first wedging surface (4462) formed at one end thereof. The wedging block has a second wedging surface (522) formed at a first end thereof. The button and the wedging block are elastically mounted in the receiving cavity. The first wedging surface mates with the second wedging surface. The flange is releasably mounted with the wedging block.

20 Claims, 7 Drawing Sheets

BATTERY COVER LATCHING ASSEMBLY FOR PORTABLE ELECTRONIC DEVICE

FIELD OF THE INVENTION

The present invention generally relates to battery cover latching assemblies and, more particularly, to a battery cover latching assembly for use in a portable electronic device.

DESCRIPTION OF RELATED ART

Batteries are widely used in portable electronic devices, such as personal digital assistants (PDAs), mobile phones and so on. A conventional battery is attachably received in a housing of the electronic device, and a battery cover is designed to connect with the housing so to enclose and protect the battery. The battery has to be replaced by removing the battery cover when the battery is, for example, damaged, exhausted, and/or in need of recharging or replacement.

A clasping structure or latching structure is generally used to engage a conventional battery cover with a housing of a portable electronic device. For example, the Alcatel OT310 mobile phone has a latching assembly for a battery cover thereof. The latching assembly includes a pair of hooks formed at one end of the battery cover and a locking pin protruding from the other opposite end of the battery cover. Accordingly, a pair of grooves is defined in one end portion of a backside of a housing of the mobile phone, and a locking hole is defined in the other opposite end portion of the backside of the housing. In assembly, the hooks of the battery cover are firstly inserted into the grooves of the housing, then the battery cover is pressed downward onto the housing until the locking pin of the battery cover is inserted into the locking hole of the housing. The battery cover is thus assembled to the housing of the mobile phone. The latching assembly is simple in structure, and the engagement between the battery cover and the housing of the mobile phone is firm, too. However, during disassembly, great effort is needed to disassemble the battery cover from the housing, thereby requiring a substantial force to be exerted thereon. Therefore, the battery cover is susceptible to damage. As a result, it is difficult for a user to replace a battery in the conventional housing of the mobile phone.

Therefore, a new battery cover latching assembly is desired in order to overcome the above-described shortcomings.

SUMMARY OF INVENTION

In one embodiment thereof, a portable electronic device includes a battery cover, a housing, and a battery cover latching assembly. The battery cover latching assembly is adapted for use in a portable electronic device. The battery cover has a flange formed at one end portion thereof. The housing has a receiving cavity defined in one end portion thereof. The battery cover latching assembly includes a button and a wedging block. The button has a first wedging surface formed at one end thereof. The wedging block has a second wedging surface formed at a first end thereof. The button and the wedging block are elastically mounted in the receiving cavity. The first wedging surface mates with the second wedging surface. The flange is releasably mounted with the wedging block.

Other advantages and novel features of the embodiments will become more apparent from the following detailed description thereof when taken in conjunction with the accompanying drawings.

BRIEF DESCRIPTION OF DRAWINGS

Many aspects of the present battery cover latching assembly can be better understood with reference to the following drawings. The components in the drawings are not necessarily to scale, the emphasis instead being placed upon clearly illustrating the principles of the battery cover latching assembly and its potential applications. Moreover, in the drawings, like reference numerals designate corresponding parts throughout the several views.

DETAILED DESCRIPTION

The present battery cover latching assembly is suitable for portable electronic devices such as mobile phones, PDAs, and so on.

Figure 1:
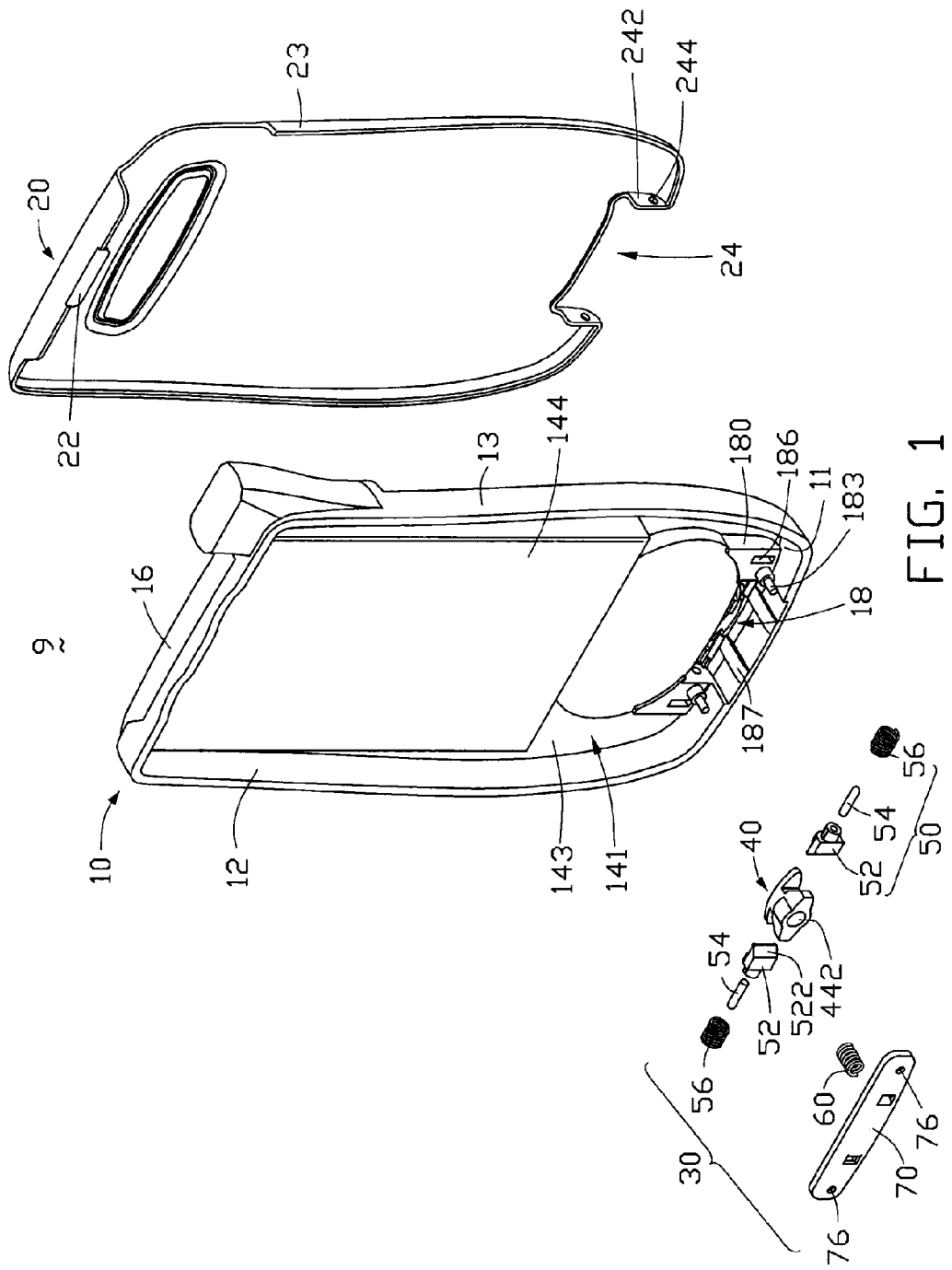
FIG. 1 is an exploded, isometric view of a portable electronic device with a battery cover and a housing interconnected via a battery cover latching assembly, in accordance with a preferred embodiment of the present invention.

Referring now to the drawings in detail, FIG. 1 shows a battery cover latching assembly 30 for use in a mobile phone 9. The mobile phone 9 is taken here as an exemplary application, for the purposes of describing details of the battery cover latching assembly 30 of a preferred embodiment of the present assembly. The mobile phone 9 includes a housing 10 and a battery cover 20 interconnected via the battery cover latching assembly 30.

Figure 2:
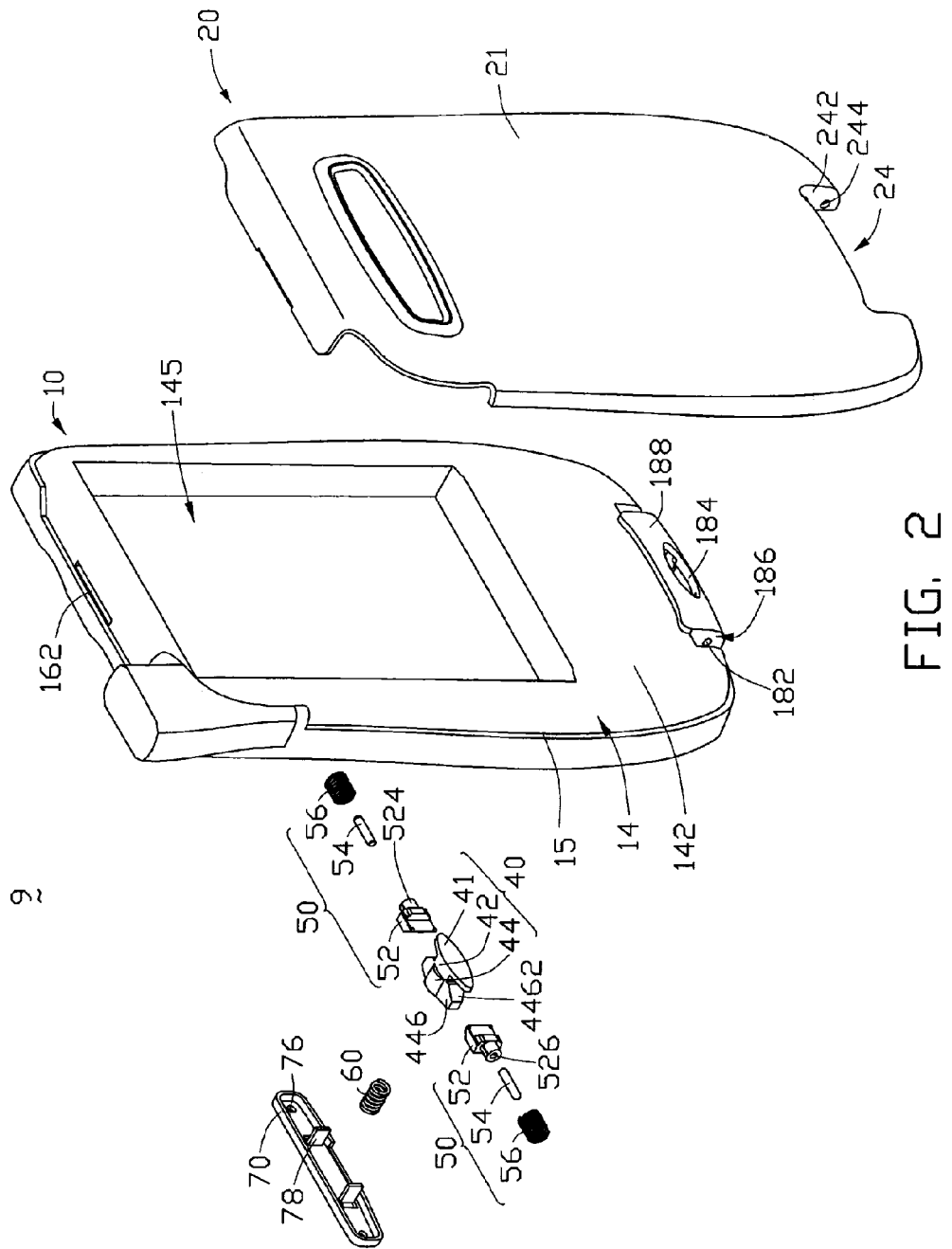
FIG. 2 is similar to FIG. 1, but viewed from another aspect.

Also referring to FIG. 2, the housing 10 includes a housing body 14. The housing body 14 is a substantially rectangular board. A top wall 16, a bottom wall 11, a left sidewall 12, and a right sidewall 13 all extend from the housing body 14 toward a same direction. The housing body 14 and the walls 11, 12, 13, 16 cooperate to define an inner cavity 141. The inner cavity 141 is configured for accommodating therein an electronic element, such as a printed circuit board, when the housing 10 is assembled with other housings of the mobile phone 9. The housing body 14 has an outer surface 142 and an inner surface 143 opposed to the outer surface 142. The center portion of the housing body 14 is recessed inwardly to form an outer cavity 145 in the outer surface 142, and therefore form a corresponding substantially cuboidal block 144 on the inner surface 143. The outer cavity 145 is configured for accommodating a battery (not shown) therein. A peripheral groove 15 is defined along a circumference of the housing body 14. A positioning slot 162 is defined in the top wall 16.

Figure 3:
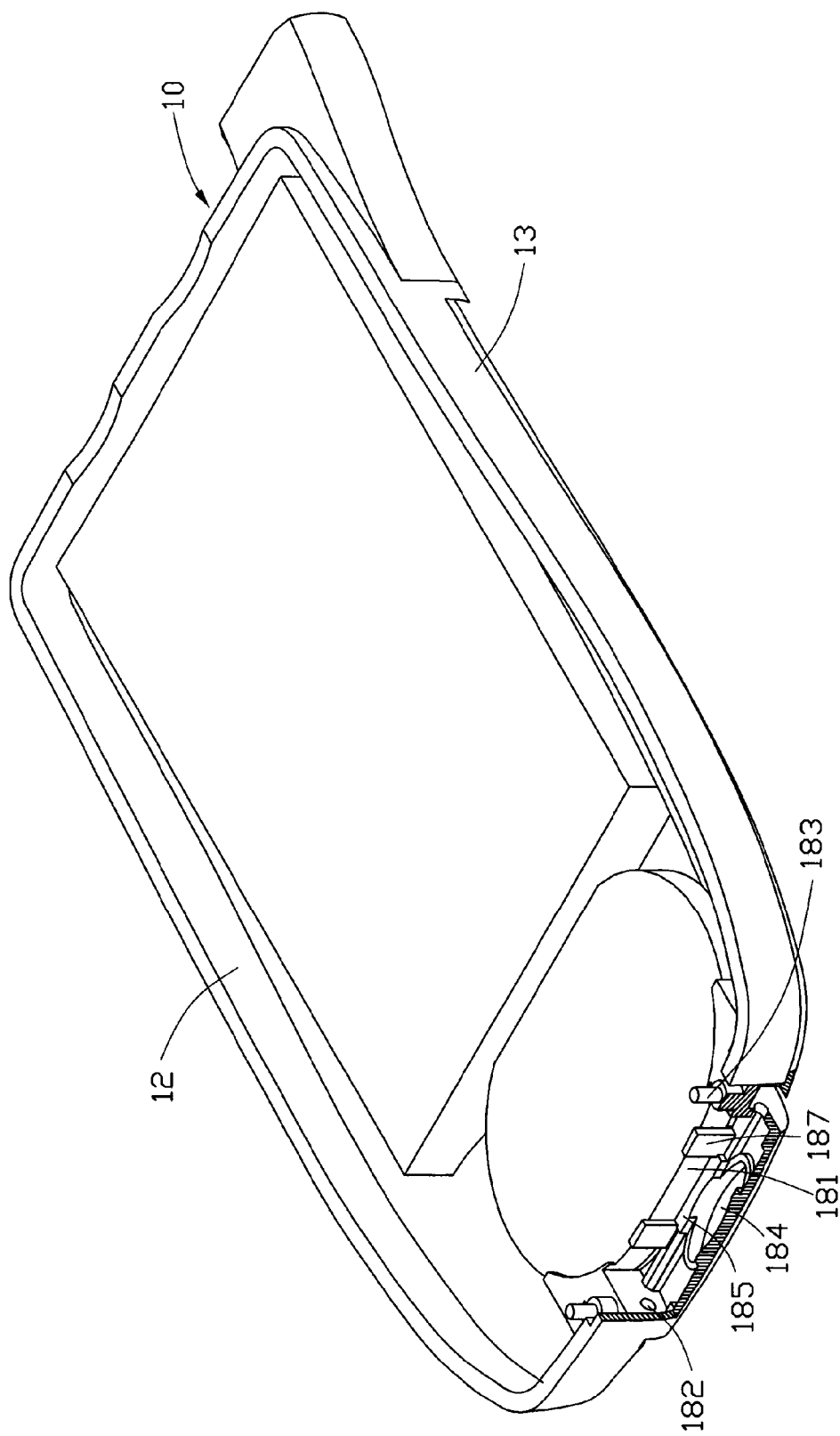
FIG. 3 is a partly cross-sectional view of the housing shown in FIG. 1.

Also referring to FIG. 3, a projection 188 extends from the outer surface 142 of the housing 10 adjacent to the bottom wall 11. The projection 188 is a substantially rectangular block. A pair of protrusions 180 is formed on the inner surface 143 adjacent to the bottom wall 11. The two protrusions 180 are spaced apart and a connecting wall 181 connects the two protrusions 180. The protrusions 180, the connecting wall 181, the bottom wall 11, and the housing body 14 together define a receiving cavity 18. A latching hole 182 is defined in each protrusion 180 adjacent to the bottom wall 11. The two latching holes 182 align with each other and both communicate with the receiving cavity 18. A positioning pole 183 is formed on each protrusion 180 and in the inner cavity 141. A button hole 184 is defined through the housing body 14 and through the projection 188. The button hole 184 communicates with the receiving cavity 18. A supporting block 185 is formed in the receiving cavity 18, and between the connecting wall 181 and the button hole 184. A pair of receiving slot 186 is defined through the housing body 14, through the protrusions 180, and respectively adjacent to two sides of the projection 188. The receiving slot 186 communicates with the latching hole 182. Four positioning blocks 187 are formed in the receiving cavity 18. Two of the positioning blocks 187 are formed on the connecting wall 181 and adjacent to two sides of the supporting block 185. The other two of the positioning blocks 187 are formed on the bottom wall 11.

The battery cover 20 has a cover body 21 and a cover sidewall 23. The cover body 21 is a substantially rectangular board. The cover sidewall 23 extends from a periphery of the cover body 21, corresponding to the groove 15. A positioning piece 22 is formed on the cover sidewall 23 at a top end of the cover 20, for engaging in the positioning slot 162 of the housing 10. The battery cover 20 has a cutout 24 defined in an opposite bottom thereof. The cutout 24 is configured for receiving the projection 188 of the housing 10. A pair of flanges 242 extends from two sides of the cutout 24 in the same direction as the cover sidewall 23. Each flange has a locking slot 244 defined through a center portion thereof. The two locking slots 244 align to each other. The flanges 242 are configured to be respectively received in the receiving slots 186, with the locking slot 244 aligning with the latching hole 182 of the housing 10.

The battery cover latching assembly 30 includes a button 40, a pair of latching mechanisms 50, a main spring 60, and a mounting board 70. The battery cover latching assembly 30 is mounted in the housing 10 and releasably locks the battery cover 20, thereby interconnecting the housing 10 and the battery cover 20.

The button 40 has an operating portion 41, a connecting portion 42, and a driving portion 44. The operating portion 41 is a substantially elliptical board. The operating portion 41 is configured for engaging in the button hole 184 of the housing 10. The connecting portion 42 is a substantially cuboidal block, and the connecting portion 42 connects the operating portion 41 and the driving portion 44. The driving portion 44 is a substantially cuboidal block. A receiving hole 442 is defined in the driving portion 44 and the connecting portion 42, for receiving the main spring 60. A pair of wedging projections 446 is formed at two opposite ends of the driving portion 44. Each wedging projection 446 has a first wedging surface 4462. The two first wedging surfaces 4462 both face towards the operating portion 41, and slope outwardly away from the connecting portion 42.

The latching mechanism 50 includes a wedging block 52, a pin 54, and an auxiliary spring 56. One end of the wedging block 52 has a second wedging surface 522 for engaging with the first wedging surface 4462 of the button 40. The other opposite end of the wedging block 52 has a cylinder 524. The cylinder 524 has a pin hole 526 defined therein for receiving the pin 54. The springs 56 and 60 are preferably made of metal and are spiral-shaped (i.e., a coil spring).

The mounting board 70 is a substantially rectangular board. A pair of positioning holes 76 is defined in two opposite ends of the mounting board 70. The positioning hole 76 is configured for receiving the positioning pole 183 of the housing 10. A pair of positioning tabs 78 is formed on the mounting board 70 perpendicular to the mounting board 70.

Figure 4:
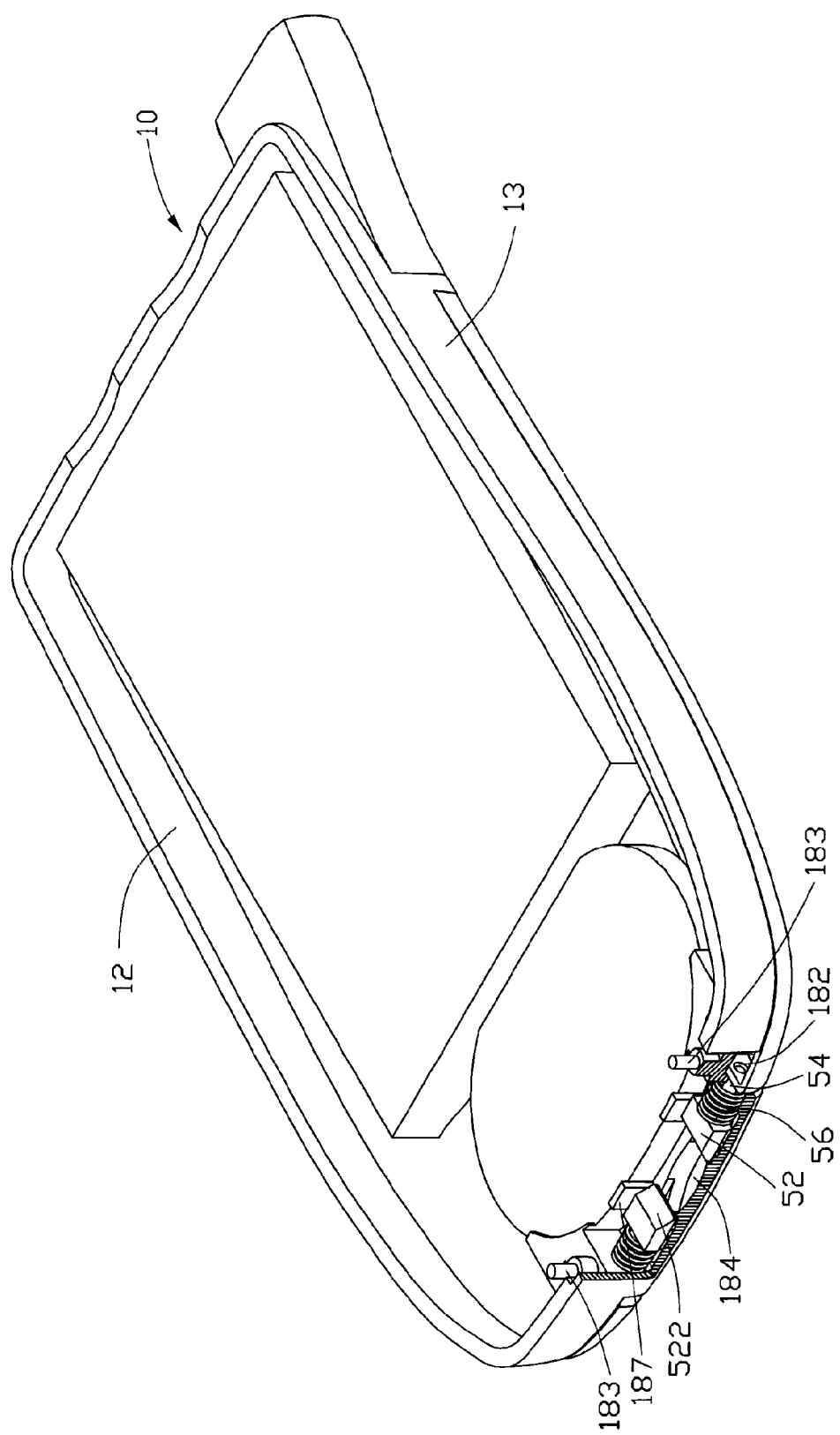
FIG. 4 is a partly cross-sectional view of the housing with a latching mechanism shown in FIG. 1.

In assembly, also referring to FIG. 4, the pins 54 are secured in the pin holes 526 of the wedging block 52, respectively. The auxiliary springs 56 are respectively placed around the pins 54, thereby assembling the latching mechanisms 50. The assembled latching mechanisms 50 are placed in the receiving cavity 18 of the housing 10 and respectively adjacent to the protrusions 180. Each wedging block 52 is mounted on the supporting block 185 and between two opposite positioning blocks 187. The second wedging surface 522 faces away from the supporting block 185. One end of each pin 54 is aligned with the corresponding latching hole 182 of the housing.

Figure 5:
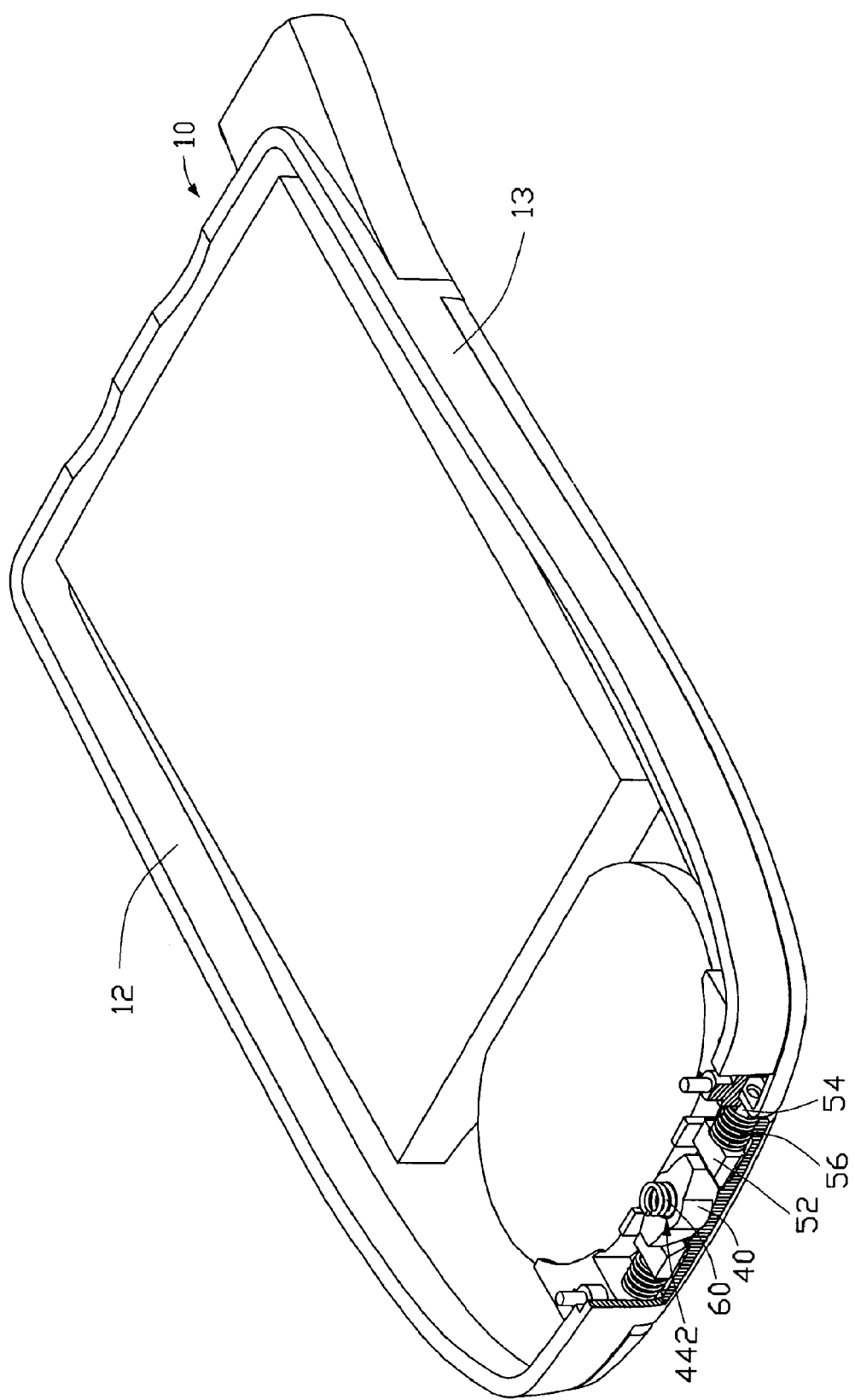
FIG. 5 is a partly cross-sectional view of the housing with the latching mechanism, a button, and a main spring shown in FIG. 1.

Also referring to FIG. 5, the button 40 is inserted into the receiving cavity 18 along a first axis perpendicular to the battery cover. The operating portion 41 is received in the button hole 184. Each first wedging surface 4462 of the button 40 drives the corresponding second wedging surface 522. The end of each pin 54 is inserted in the corresponding latching hole 182 and the corresponding receiving slot 186 of the housing 10. When the auxiliary springs 56 are in compression, one end of each auxiliary spring 56 abuts the protrusion 180, and the other opposite end of each auxiliary spring 56 abuts the wedging block 52. The main spring 60 is inserted into the receiving hole 442 of the button 40.

Figure 6:
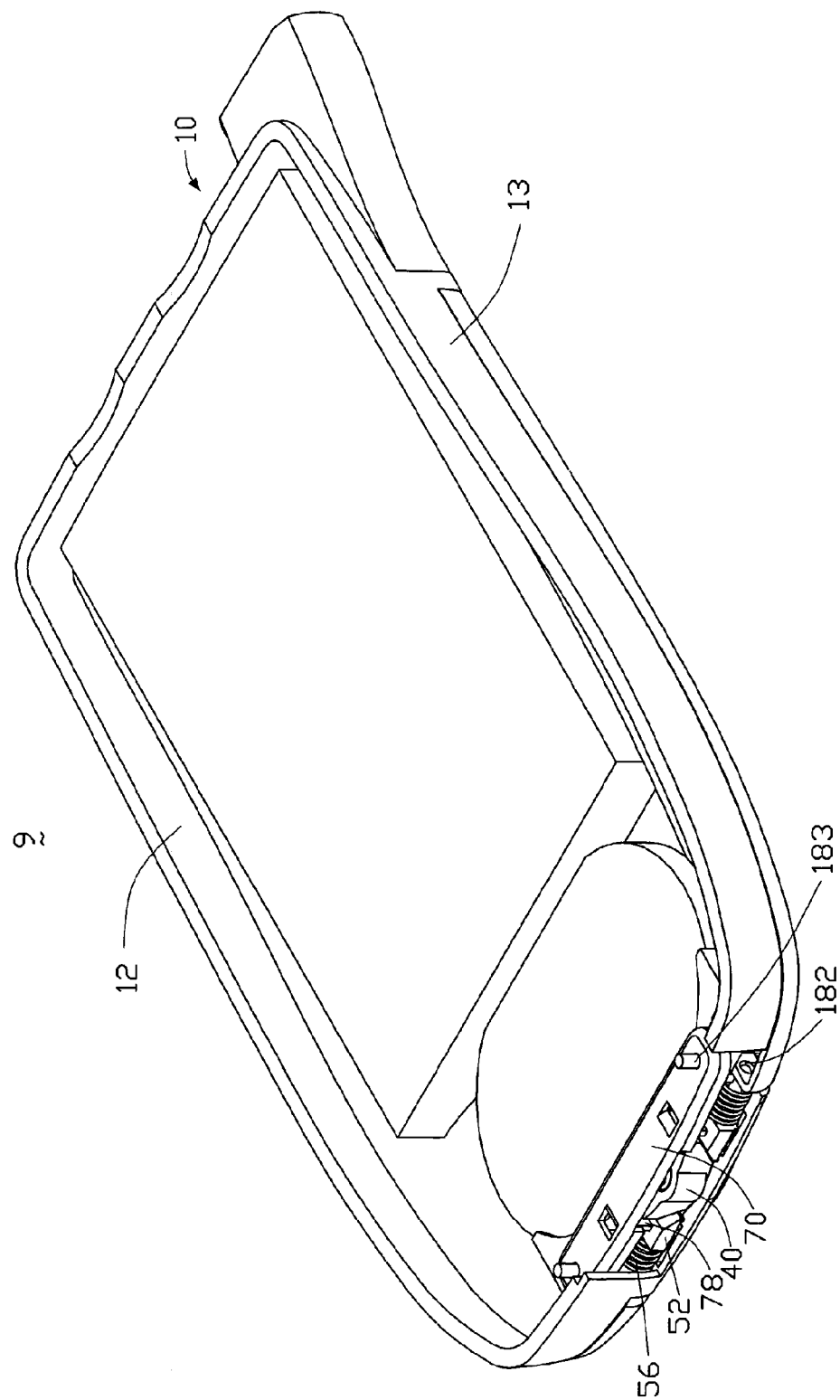
FIG. 6 is an assembled, isometric view of the battery cover latching assembly and the housing.

Also referring to FIG. 6, the positioning poles 183 of the housing 10 are forced to travel through the positioning holes 76, thereby mounting the mounting board 70 with the housing 10. When the main spring 60 is in compression, one end of the main spring 60 is secured in the receiving hole 442, and the other opposite end of the main spring 60 abuts the mounting board 70. The operating portion 41 is exposed partly out of the button hole 184. Each positioning tab 78 abuts the corresponding wedging block 52, so that the wedging block 52 always abuts the supporting block 185 and is slidable along a second axis perpendicular to the first axis. Thus the battery cover latching assembly 30 is assembled with the housing 10.

When assembling the battery cover 20 to the housing 10, the positioning piece 22 of the battery cover 20 is inserted into the positioning slot 162 of the housing 10. The battery cover 20 is pressed toward the housing 10. When each flange 242 of the battery cover 20 moves into the receiving slot 186 of the housing and abuts against the pin 54, the operating portion 41 of the button 40 is pressed inwardly in the receiving cavity 18. Hence the wedging projections 446 of the driving portion 44 of the button 40 move together with the operating portion 41. During this process, the main spring 60 is further compressed. The wedging block 52 moves closer to the connecting portion 42 of the button 40 and away from the protrusion 180, because of the engagement of the first wedging surface 4462 and the second wedging surface 522, and the action of the de-compressed auxiliary spring 56. Hence each pin 54 moves out of the receiving slot 186, and the wedging blocks 52 are in a first position.

Figure 7:
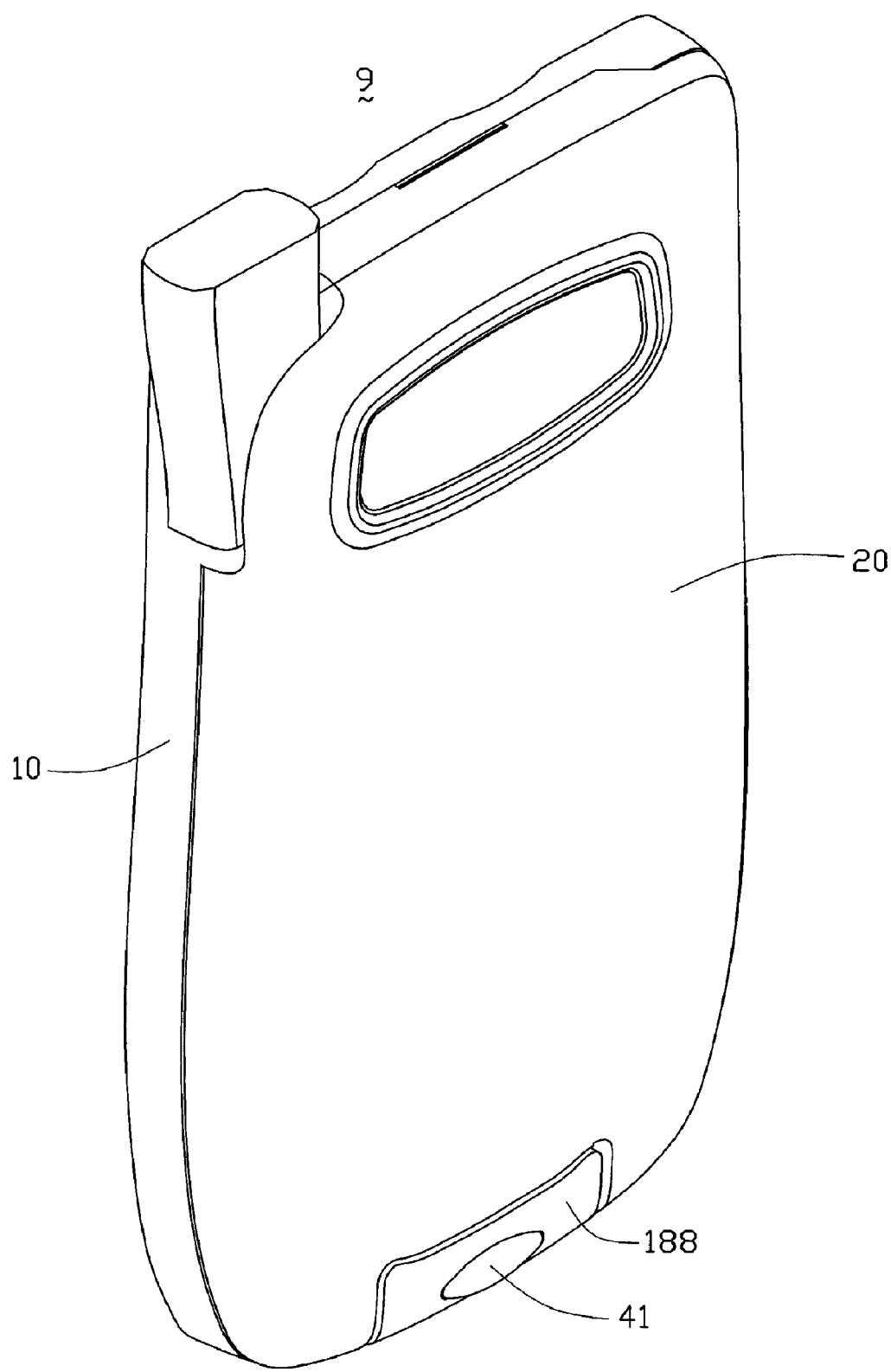
FIG. 7 is an assembled, isometric view of the portable electronic device of FIG. 1.

The battery cover 20 is further pressed, and each flange 242 of the battery cover 20 moves further into the receiving slot 186, until the projection 188 of the housing 10 is received in the cutout 24 of the battery cover 20. At this time, each locking hole 244 of the flange 242 aligns with the corresponding latching hole 182. The operating portion 41 of the button 40 is released, and the de-compressed main spring 60 drives the operating portion 41 of the button 40 outwardly out of button hole 184. The wedging block 52 moves away from the connecting portion 442 and closer to the protrusion 180, because of the engagement of the first wedging surface 4462 and the second wedging surface 522. The auxiliary spring 56 is compressed again. Hence each pin 54 moves together with the wedging block 52, and into the corresponding receiving slot 186 and the corresponding locking hole 244 of the battery cover 20. Now the wedging blocks 52 are in a second position. Thus the battery cover 20 is assembled with the housing 10 of the mobile phone 9, as represented in FIG. 7. The disassembling process of the battery cover 20 is similar to the above assembling process except that when the pin 54 moves out of the receiving slot 186, the battery cover 20 is unfolded in an upwards direction from the housing 10.

It is to be understood that the pin 54 may be formed with the wedging block 52 integrally. The springs 56 and 60 may alternatively be made of another material (e.g., plastic or rubber) and/or have a different configuration, for example, leaf spring or resilient cylinder. In addition, the main spring 60 may be omitted, and the button 40 is made of elastic material. The auxiliary springs 56 may be omitted, and the cylinder 524 of the wedging block 52 is made of elastic material.

As described above, the preferred embodiment provides a battery cover latching assembly for devices such as mobile phones. When the button is pushed, the cover of the battery cover assembly can be easily removed. This provides ease-of-use for the user.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery cover latching assembly for use in a portable electronic device, the portable electronic device having a battery cover and a housing, the battery cover having a flange extending from one end portion thereof, the housing defining a receiving cavity in one end portion thereof, the battery cover latching assembly comprising:
    a button with a first wedging surface formed at one end thereof; and
    a wedging block having a second wedging surface formed at a first end thereof;
    wherein the button and the wedging block are elastically mounted in the receiving cavity, the first wedging surface mates with the second wedging surface, when the button is pressed towards the housing, the second wedging surface moves towards the button, and the wedging block is configured for releasably engaging with the flange.

2. The battery cover latching assembly as claimed in claim 1, further comprising a mounting board, wherein the mounting board is fixed in the receiving cavity of the housing.

3. The battery cover latching assembly as claimed in claim 2, wherein a positioning tab is fanned at the mounting board, and a distal end of the positioning tab abuts the wedging block.

4. The battery cover latching assembly as claimed in claim 1, further comprising a main elastic member, wherein one end of the main elastic member abuts the button and the other end of the main elastic member abuts the housing.

5. The battery cover latching assembly as claimed in claim 4, further comprising an auxiliary elastic member, wherein one end of the auxiliary elastic member abutting with the housing, and the other opposite end of the auxiliary elastic member abutting with the wedging block, when the button is pressed towards the housing, the auxiliary elastic member decompresses to drive the second wedging surface to move towards the button.

6. The battery cover latching assembly as claimed in claim 5, wherein the housing defines a latching hole therein, the flange defines a locking hole therein, and the pin of the wedging block is configured for engaging in the latching hole and the locking hole.

7. The battery cover latching assembly as claimed in claim 1, wherein a projection is formed at one end of the housing, and a receiving slot is defined adjacent to one side of the projection for receiving the flange.

8. The battery cover latching assembly as claimed in claim 7, wherein the projection defines a button hole therethrough, and the button is exposed out of the button hole.

9. The battery cover latching assembly as claimed in claim 7, wherein the battery cover defines a cutout in one end portion thereof, and the projection is mounted in the cutout.

10. A portable electronic device, comprising:
    a housing having a receiving cavity defined in one end portion thereof;
    a battery cover including two flanges formed at one end thereof; and
    a battery cover latching assembly interconnecting the housing and the battery cover, the latching assembly comprising:
    a button with two first wedging surfaces formed at two ends thereof; and
    two wedging blocks, each wedging block having a second wedging surface formed at a first end thereof;
    wherein the button and the wedging blocks are elastically mounted in the receiving cavity, the first wedging surface mates with the second wedging surface, when the button is pressed towards the housing, the two wedging blocks move towards each other, and the flange is releasably mounted with the wedging block.

11. The portable electronic device as claimed in claim 10, further comprising a mounting board, wherein the mounting board is fixed in the receiving cavity of the housing.

12. The portable electronic device as claimed in claim 11, wherein a positioning tab is formed at the mounting board, and a distal end of the positioning tab abuts the wedging block.

13. The portable electronic device as claimed in claim 10, further comprising a main elastic member, wherein the button defines a receiving hole therein for receiving the main elastic member.

14. The portable electronic device as claimed in claim 10, further comprising an auxiliary elastic member, wherein an opposite second end of the wedging block has a pin, the auxiliary elastic member is placed around the pin, one end of the auxiliary elastic member abutting with the housing, and the other opposite end of the auxiliary elastic member abutting with the wedging block.

15. A battery cover latching assembly for a portable electronic device, the latching assembly comprising:
    a battery cover including a first latching element;
    a button resiliently loaded along a first axis perpendicular to the battery cover, the button having a first wedging surface inclined with respect to the first axis;
    a latching mechanism comprising a wedging block and an auxiliary elastic member, the wedging block being resiliently loaded against the button along a second axis perpendicular to the first axis, the wedging block comprising a second latching element corresponding to the first latching element, the wedging block having a second wedging surface mating with the first wedging surface in such a manner that upon moving the button along the first axis, the wedging block is moved along the second axis to drive the second latching element to move between a first position and a second position, wherein when in the first position, the auxiliary elastic member decompresses to drive the second latching element disengage from the first latching element, and when in the second position, the second latching clement engages with the first latching element to compress the auxiliary elastic member.

16. The battery cover latching assembly as claimed in claim 15, wherein the first latching element has a locking hole defined therein, the second latch element comprises a locking pin for insertion into the locking hole.

17. The battery cover latching assembly as claimed in claim 15, further comprising a mounting board and a main elastic member, the mounting board being configured fir being fixed with a housing of the portable electronic device, the main elastic member being engaged between the mounting board and the button to bias the button away from the mounting board.

18. The battery cover latching assembly as claimed in claim 15, wherein the button comprises another first wedging surface, the wedging surface and the another wedging surface are located at opposite sides of the button, the latch mechanism comprises another wedging block, and the another wedging block has another second wedging surface mating with the another first wedging surface, when the button is pressed towards the housing, the two wedging blocks move towards each other.

19. The battery cover latching assembly as claimed in claim 1, wherein the button is resiliently loaded along a first axis perpendicular to the battery cover, the first wedging surface is inclined with respect to the first axis, the wedging block is resiliently loaded against the button along a second axis perpendicular to the first axis, when the button is moved along the first axis, the wedging block is moved along the second axis to mate with the flange between a first position and a second position, wherein when in the first position, the wedging block disengages from the flange, and when in the second position, the wedging block engages with the flange.

20. The battery cover latching assembly as claimed in claim 15, wherein the button comprises another first wedging surface, the wedging surface and the another wedging surface are located at opposite sides of the button, the latch mechanism comprises another wedging block, and the another wedging block has another second wedging surface mating with the another first wedging surface, when the button is pressed towards the housing, the two wedging blocks move towards each other.

\* \* \* \* \*

UNITED STATES PATENT AND TRADEMARK OFFICE
CERTIFICATE OF CORRECTION

PATENT NO. : 7,629,074 B2 Page 1 of 1
APPLICATION NO. : 11/307745
DATED : December 8, 2009
INVENTOR(S) : Li et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 861 days.

Signed and Sealed this

Second Day of November, 2010

David J. Kappos
*Director of the United States Patent and Trademark Office*